United States Patent [19]
Camacho et al.

[11] Patent Number: 6,131,701
[45] Date of Patent: Oct. 17, 2000

[54] APPARATUS AND METHOD FOR CLEANING AND FLUID EXCHANGE OF A LOW-FLOW AUTOMATIC TRANSMISSION

[75] Inventors: Michael Camacho, Rancho Cucamonga; Mark Sasaki, Riverside, both of Calif.

[73] Assignee: Wynn Oil Company, Azusa, Calif.

[21] Appl. No.: 09/458,797

[22] Filed: Dec. 10, 1999

Related U.S. Application Data

[60] Division of application No. 09/106,530, Jun. 29, 1998, which is a continuation-in-part of application No. 08/816,486, Mar. 13, 1997, Pat. No. 5,806,629.

[51] Int. Cl.$^7$ ............................................ F16C 3/14
[52] U.S. Cl. ........................ 184/1.5; 137/240; 137/270; 137/597
[58] Field of Search ........................... 184/1.5; 137/240, 137/270, 597

[56] References Cited

U.S. PATENT DOCUMENTS

| | | | |
|---|---|---|---|
| 3,612,490 | 10/1971 | Bopp et al. | 259/154 |
| 4,037,697 | 7/1977 | Prenzel | 192/91 R |
| 5,143,185 | 9/1992 | Klein et al. | 188/299 |
| 5,390,762 | 2/1995 | Nelson | 184/1.5 |
| 5,669,464 | 9/1997 | Earleson | 184/1.5 |
| 5,685,396 | 11/1997 | Elkin et al. | 184/1.5 |
| 5,787,372 | 7/1998 | Edwards et al. | 184/1.5 |
| 5,853,068 | 7/1998 | Dixon et al. | 184/1.5 |
| 5,964,318 | 10/1999 | Boyle et al. | 184/1.5 |

*Primary Examiner*—David A. Bucci
*Assistant Examiner*—Chong H. Kim
*Attorney, Agent, or Firm*—Terry L. Miller

[57] ABSTRACT

A fail-safe transmission service machine (12) allows old ATF to be pumped out of a transmission (10b) as a vehicle engine (10a) runs while the vehicle (10) is stationary. The machine (12) responsively pumps a matching volume of new ATF into the transmission so that dry running of the transmission can not occur. If the supply of new ATF runs out or if power to the service machine (12) is interrupted, the machine reverts to closed loop fluid circulation for the transmission. A hydraulic rectifier (42) provides for universal connection of hoses between the transmission cooler fluid circulation loop (39) of the vehicle (10) and the service machine (12). An electrically driven assistance pump (94) allows the service of vehicles which have low-flow or low-pressure transmission pumps.

14 Claims, 7 Drawing Sheets

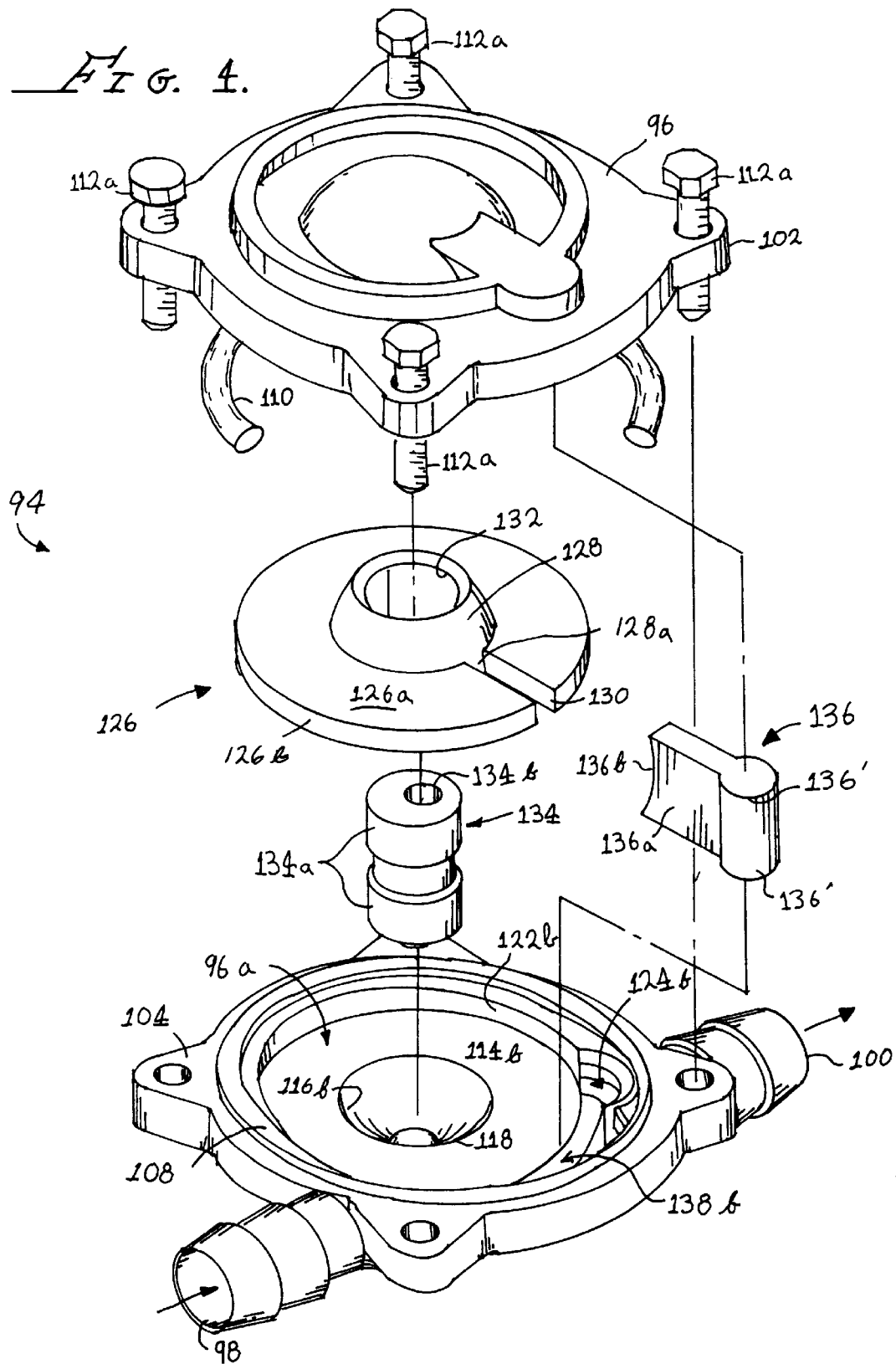

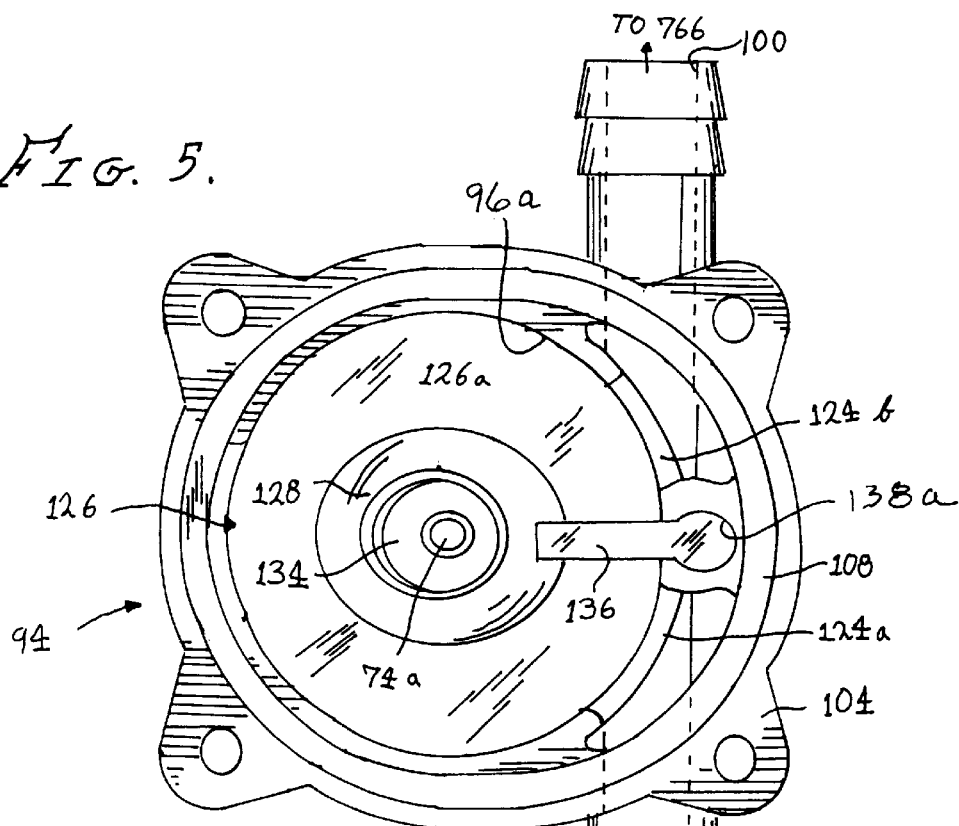
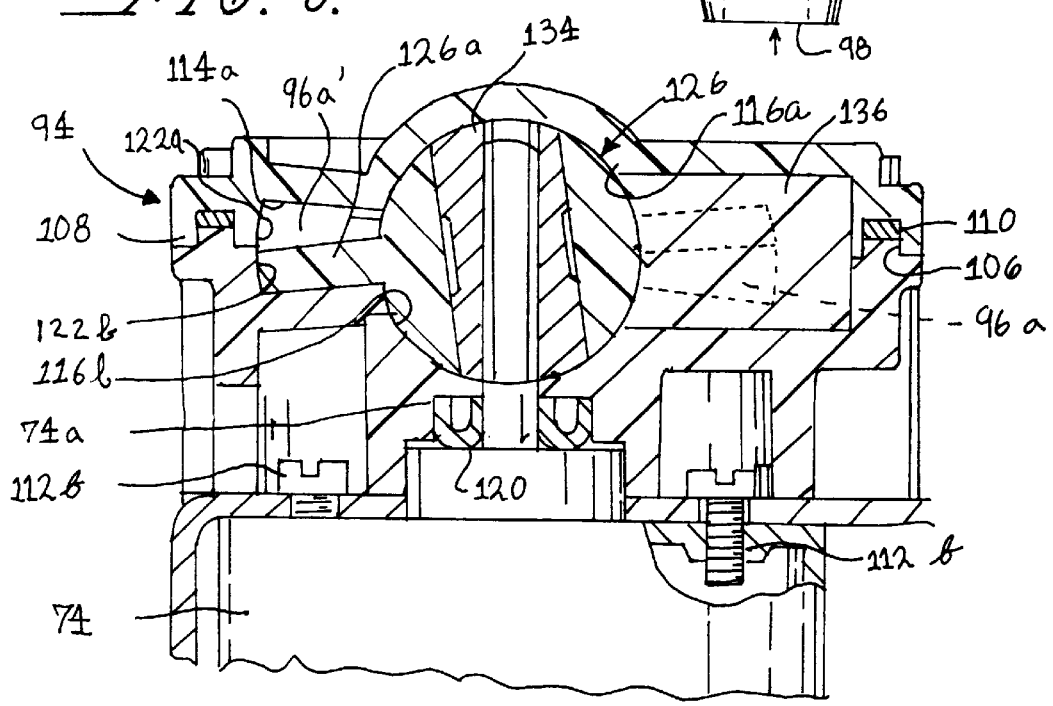

APPARATUS AND METHOD FOR CLEANING AND FLUID EXCHANGE OF A LOW-FLOW AUTOMATIC TRANSMISSION

CROSS-REFERENCE TO RELATED APPLICATIONS

The present application is a Divisional application of U.S. application Ser. No. 09/106,530, filed Jun. 29, 1998, now pending, which is a Continuation-in-Part of U.S. application Ser. No. 08/816,486, filed Mar. 13, 1997, now U.S. Pat. No. 5,806,629, issued Sep. 15, 1998.

BACKGROUND OF THE INVENTION

1. Field of the Invention

The present invention is in the field of apparatus and method used first to internally clean a transmission (i.e., by adding and circulating a cleaning fluid to the used ATF), and then to discharge old ATF from the automatic transmission. While the old ATF is discharged, new ATF is simultaneously delivered into the transmission. Thus, the apparatus and method may be used to clean an automatic transmission and exchange the old fluid with new, all while the transmission is installed in a vehicle, such as in an automobile, truck or bus, for example. Particularly, the present apparatus and method addresses the problem of servicing those automotive vehicles having automatic transmissions with internal transmission pumps of low-flow or low-pressure characteristics. These low-pressure and low-flow characteristics make this type of transmission particularly difficult to clean and service.

2. Related Technology

Many conventional machines and methodologies presently exist for withdrawing used ATF from an automotive automatic transmission, and for replacing this old fluid with new fluid, either sequentially or simultaneously while the old fluid is removed or discharged from the transmission.

The traditional method of changing the fluid in an automatic transmission (i.e., by dropping the transmission pan and replacing the fluid and transmission filter) has fallen into disfavor because it leaves such a large percentage of the old fluid in the transmission.

More favored at the present time are machines and methods which employ the internal pump of the transmission to discharge the ATF, while new ATF is supplied into the transmission on a volume matching basis. The vehicle engine is ordinarily operated in order to drive the internal pump of the transmission. This operation of the vehicle engine is usually accomplished by running the vehicle engine with the transmission in "neutral" or "park", with most of the old ATF being exchanged in this way (i.e., without the drive wheels spinning or the transmission clutches being cycled). In this way, the old ATF is flushed from the transmission, torque converter, ATF cooler, and connecting conduits of the transmission system. Alternatively, the vehicle can be operated on a chassis roller stand, allowing the drive wheels to spin and the clutches of the transmission to be cycled. Operation of the vehicle engine powers the internal fluid pump of the transmission and facilitates flow of ATF through the torque converter and other parts of the transmission system, effectively flushing out the old ATF and replacing it with new fluid. In this latter case, the transmission clutches will also be cycled to remove old ATF.

A cleaning machine for an automotive automatic transmission is known according to U.S. Pat. No. 5,337,708, issued Aug. 16, 1994 to We-Yu Chen. The '708 patent is believed to teach a transmission fluid change machine in which an external ATF circulation loop of the transmission is opened, with part of the machine completing this loop in one mode of operation. The used transmission fluid, possibly with a transmission flushing solution, is circulated in the external circulation loop as completed by the machine. When operated in an exchange/refill mode, the machine receives old transmission fluid and supplies new fluid at a selected pressure or volume delivery rate.

The machine taught by Chen is intended to be operated from the 12 volt power supply of the automobile or other automotive vehicle being serviced. The new transmission fluid tank of this device appears to be provided with a level sensor, so that the system can be reverted to loop configuration (filtration/flushing) should the level of new ATF drop too low. An external power-driven pump is utilized to move new ATF from the fluid tank to the transmission being serviced. However, it is not clear from this patent that in the event the power supply to this device is interrupted or the pump ceases to operate, that the configuration of the device is reverted to loop form so that the transmission of the vehicle being serviced is not damaged by being operated with insufficient ATF. Although this patent asserts that a power failure will cause reversion of the apparatus to loop configuration in the event of a power failure, how this change in configuration is to be effected or powered does not appear to be explained.

Another transmission fluid change apparatus is disclosed by U.S. Pat. No. 5,318,080, issued Jun. 7, 1994 to James P. Viken. The '080 patent is believed to disclose an apparatus in which supply of the new ATF is provided by a pressurized storage container, which container is pressurized by the inflow of used ATF pumped from the transmission by its own internal pump. The storage container has a chamber which is separated by a flexible wall (i.e., a rolling-diaphragm piston) into two sub-chambers expanding and contracting in opposition. As used ATF from the transmission is received into one sub-chamber, new ATF is displaced from the other sub-chamber to the transmission. Another embodiment of this device uses two separate containers, one receiving the old ATF and the other holding new ATF. Air displaced from the one container is routed into the other with the idea that the air will drive the new ATF into the transmission. A pressurized air assist to this delivery of new fluid is provided. There is considerable uncertainty with these machines that the rate of new fluid delivery really matches the rate of old fluid draining from the transmission under service.

Another transmission service machine is known according to U.S. Pat. No. 5,370,160, issued Dec. 6, 1994 to Zachary T. Parker. The '160 patent is believed to disclose a service machine in which the external ATF fluid return loop for the transmission is completed by a reservoir from which the fluid is drawn by a pump. Accordingly, in the event that operation of the pump is interrupted while the serviced vehicle continues to operate, the transmission of the vehicle is at risk of damage from dry running. A separate pump is used to supply new ATF to the transmission, but this pump may suffer from the same power supply interruption, so that the transmission is still at risk of damage from dry running. The Parker '160 patent does not appear to provide a closed external ATF circulation loop for the transmission being serviced (other than the one relying on operation of an external power-driven pump), and does not use a three-way valve to complete or open such an external ATF circulation loop.

Still another apparatus for exchanging the fluid of an automatic transmission is known in accord with U.S. Pat. No. 5,447,184, issued Sep. 5, 1995 to Eduardo Betancourt. The '184 patent is believed to disclose an apparatus in which a reservoir for new ATF is provided so that the volume of new fluid supplied to the transmission can exceed the withdrawn volume. The '184 patent appears to include a sensor operating a bell to bring the attendant's attention to the fact that the supply of new ATF is at risk of running out. However, if the attendant is either not close at hand to hear the bell or is inattentive, the transmission may still be damaged if the supply of new ATF runs out while the transmission is being flushed. Still further, the device taught by the '184 patent is not believed to provide any safeguard to protect the automatic transmission in the event of a power failure to the apparatus while the transmission is being flushed during operation.

Finally, an apparatus for flushing an automatic transmission is known according to U.S. Pat. No. 5,472,064, issued Dec. 5, 1995. The feature which the '064 patent appears to contribute to the art is the use of a conventional directional flow control valve. This flow control valve is inserted into the fluid flow conduits connecting the service machine to the external loop of the transmission, and allows connection of the apparatus to the external ATF circulation loop (i.e., the ATF cooler loop) of the transmission with no need to take note of the direction of fluid circulation in this loop. If the internal fluid flow direction of the machine happens to be correct as connected, there is no need to change the valve position. In the event the internal fluid flow direction of the machine is opposite to that of the transmission connection, then reversing the position of the flow control direction valve will match the internal flow direction to the direction of the fluid flow in the external ATF flow loop of the transmission. This machine requires attention and manual intervention of the technician to correct the fluid flow directions so that service can begin in the event that by chance these connections to the transmission are not right to begin with.

None of these conventional transmission service machines address or solve the problem presented by some low-flow or low-pressure automatic transmissions. That is, some transmissions have an internal pump which does not provide the required pressure or fluid flow volume necessary to effect exchange of the transmission fluid (ATF) using conventional machines and methods for this purpose.

SUMMARY OF THE INVENTION

In view of the deficiencies of the conventional art, a primary object for this invention is to avoid one or more of these deficiencies.

A primary object for this invention it to provide an automatic transmission service apparatus and method which allows low-flow or low-pressure automatic transmissions to be serviced in the way described above by simultaneous discharge of the old ATF and replacement with new ATF.

Still another object is to provide such an apparatus and method in which an internal hydraulic rectifier provides both for a universal connection of the apparatus to vehicles being serviced, and also has a novel structure which both simplifies the structure of the machine and reduces the possibilities of fluid leakage in the machine.

Another object is to provide a fail-safe automatic transmission service machine.

Accordingly, the present invention provides a method of exchanging used ATF with new ATF in an automotive automatic transmission having an internal pump and an external fluid circulation loop, and without limitation on the volume of ATF which can be exchanged, the method comprising steps of providing a source of new ATF; connecting a positive displacement motor/pump unit into the external fluid circulation loop, so that the loop is opened and old ATF from the transmission flows via a motor portion of the motor/pump unit to waste by reason of pressure provided by the internal transmission pump assisting in driving the pump portion of the motor/pump unit, and flowing new ATF from the source through both a low energy usage assistance pump drawing power from the vehicle, and the pump portion of the motor/pump unit, and then to the automatic transmission so as to effect a pseudo-closing of the external fluid circulation loop, whereby used ATF pumped out of the transmission by the internal pump is continuously replaced in equal volume with new ATF from the source by the motor/pump unit.

In another aspect, the present invention provides an apparatus for exchanging used ATF with new ATF in an automotive automatic transmission having an internal pump and an external fluid circulation loop, said apparatus comprising: a source of new ATF; a positive displacement motor/pump unit for connection into said external fluid circulation loop so that said loop is opened and old ATF from the transmission flows via a motor portion of the motor/pump unit to waste by reason of pressure provided by said internal pump of the transmission assisting to drive a pump portion of said motor/pump unit, and an assistance pump flowing new ATF from said source through said pump portion of said motor/pump unit to said automatic transmission so as to effect a pseudo-closing of said external fluid circulation loop, whereby used ATF pumped out of said transmission by said internal pump is continuously replaced in equal volume with new ATF from said source by said assistance pump and said motor/pump unit in cooperation.

According to yet another aspect the present invention provides a hydraulic rectifier including a unitary body providing a housing for the rectifier and having four intersecting bores, each bore opening outwardly on the body to define a respective one of four fluid flow ports on the body, said four fluid flow ports providing two fluid inlet ports and two fluid outlet ports, and each bore also communicating between the respective opening of that bore on the body and another one of the four bores in a sequential connection internally of the body; each bore adjacent to its opening providing means for connection with a fluid flow conduit at said opening on said body; and four unidirectional flow check valves, each check valve being interposed in a respective one of said four bores between the opening of the bore and the communication of the bore with another one of the four bores, and said four check valves being disposed for unidirectional flow in the respective ones of said four bores so as to allow fluid flow only from the two of the openings on said body which are inlet opening and only from the two of the openings which are outlet openings on said body.

A better understanding of the present invention will be obtained from reading the following description of a single exemplary preferred embodiment of the present invention taken in conjunction with the appended drawing Figures. It will be understood that the appended drawing Figures and description here following relate only to one exemplary preferred embodiment of the invention, and as such, are not to be taken as implying a limitation on the invention. No such limitation on the invention is implied, and none is to be inferred.

BRIEF DESCRIPTION OF THE DRAWING FIGURES

FIG. 1 provides a fragmentary pictorial and somewhat schematic depiction of an automobile having its automatic transmission serviced by a machine embodying the present invention;

FIG. 2 is a schematic representation of automobile power train (engine and transmission) as will as the transmission service machine seen in FIG. 1, and depicts alternative modes of operation (or fluid flow paths) utilized during the servicing of the transmission;

FIG. 3, provides a perspective view of a motor/pump unit used in the transmission service machine seen in FIGS. 1 and 2, and is shown with the housing of this motor/pump illustrated in phantom lines for improved clarity of description; and FIG. 4 is a fragmentary exploded perspective view of an electrically driven assist pump used in the embodiment of the invention seen in FIG. 2;

FIGS. 5 and 6, respectively, are a fragmentary cross sectional view in plan and a fragmentary cross sectional view in elevation, of the electrically driven assist pump seen in FIG. 4;

FIGS. 7 and 8, respectively, are a front elevation view in cross section, and a side elevation view, of a hydraulic rectifier used in the embodiment of the machine seen in FIG. 2;

FIGS. 9 and 10, respectively, are fragmentary views, partially in cross section showing a unidirectional check valve mechanism of the hydraulic rectifier of FIGS. 7 and 8, and in alternative operating positions; and FIG. 11 provides a fragmentary view of an alternative embodiment of the invention in which an assistance to a motor/pump unit is provided by a torque motor.

DETAILED DESCRIPTION OF AN EXEMPLARY PREFERRED EMBODIMENT OF THE INVENTION

Figure 1:
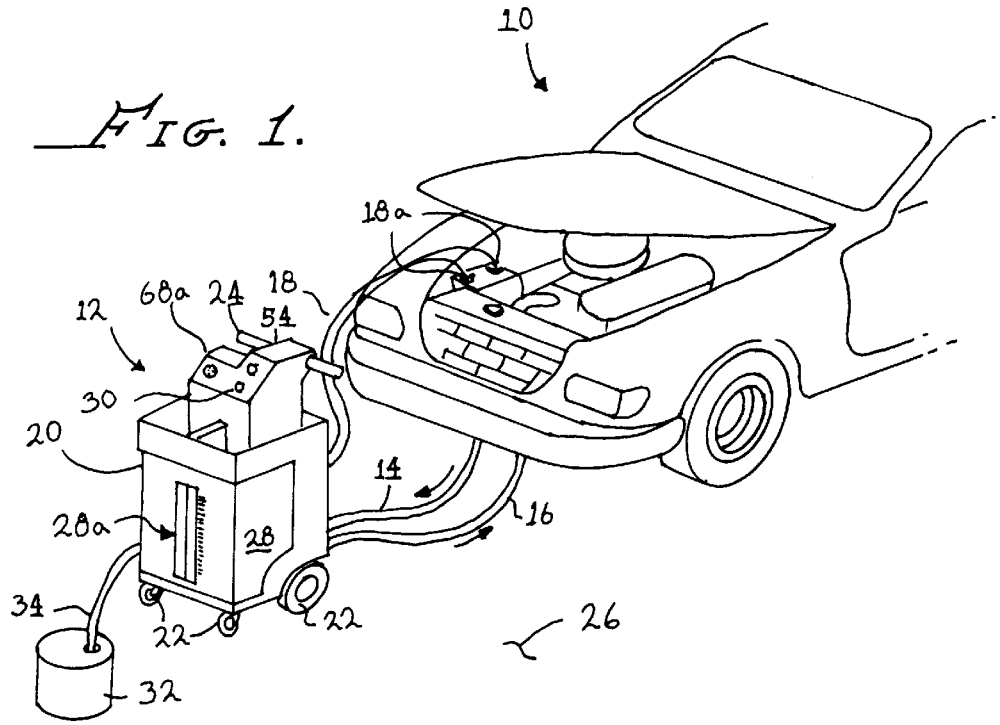

Referring to FIG. 1, an automotive vehicle 10 is seen having its automatic transmission serviced by use of a fail-safe machine 12 embodying the present invention. It will be understood that the vehicle 10 is illustrative only, and that other types of automotive vehicles may have their transmissions serviced by use of the machine 12. For example, some heavy trucks and buses use automatic transmissions, which also may be serviced in the way described below.

In general view, it is seen that the machine 12 is connected to the vehicle 10 in two respects. First, the machine 12 is connected by a pair of hoses 14 and 16 to the transmission cooling fluid circuit of the vehicle 10, as will be explained. Also, the machine 12 is electrically connected in this case by a cable 18 to receive electrical power from the vehicle 10. The cable attaches by clamps 18a to the appropriate terminals of the vehicle battery. The machine 12 requires no line power (i.e., no 110 volt or 220 volt AC power, for example), and uses only a small current of electrical power from the vehicle 10 to operate both a fail-safe function of the machine and a fluid flow assist function, as will be further described below.

The machine 12 includes a cabinet 20 having wheels 22 and a handle 24 providing for the cabinet to be rolled about a service area, for example, to an appropriate position next to a vehicle to be serviced. The machine 12 will be seen to have a very low center of gravity so that it is not easily tipped over while being moved and is stable both while stationary and during such moving on its wheels about the floor of a service area (generally indicated with the numeral 26). Such low center of gravity is provided by the machine 12 because essentially the entire lower portion 28 of the cabinet defines a reservoir for new transmission fluid, providing an exceptionally low center of gravity for the machine 12. The front of the machine 12 is provided with a vertically extending sight glass 28a (actually formed of break-resistant plastic tubing) providing an indication of the fluid level in the reservoir portion 28 of the machine 12.

Still viewing FIG. 1, it is seen that during service of the transmission of vehicle 10, the vehicle engine is run, and the vehicle may be in neutral or park, or may be on a chassis roller stand allowing the drive wheels of the vehicle to spin with the vehicle stationary. In this situation, the internal pump(s) of the transmission will be operating, and used ATF will flow from the vehicle transmission via hose 14 to the machine 12. During an initial transmission flushing mode of operation, the used ATF (possibly with a flushing chemical added for this phase of transmission cleaning during which varnish and debris in the transmission are loosened for removal) flows back to the transmission via hose 16. In other words, in a flushing mode of operation, the machine 12 completes an external closed fluid flow loop for the transmission.

However, when a service technician actuates switch 30 the machine 12 enters an AFT exchange mode of operation. In this exchange mode of operation, used ATF flows from the transmission to machine 12, and then to a container 32 via a hose 34 for recycling or appropriate disposal. The hose 34 may simply be routed to a large used-fluid storage tank maintained by some service facilities for this purpose. The service area in this case will have access to many conveniently located inlets to this storage tank, and the container 32 will not be needed. Simultaneously, new ATF is supplied by the machine 12 from the reservoir 28 into the transmission of the vehicle via hose 16.

While this AFT exchange process is going on the fluid flow rates in the hoses 14 and 16 are substantially matched to one another by the machine 12. Accordingly, the fluid level in the transmission of the vehicle 10 can not drop too low, and transmission damage from dry running can not occur.

In the event the reservoir 28 is allowed to run out of new ATF, the machine 12 will either not enter exchange mode, or will automatically revert from this mode to flush (i.e., recirculation) mode. Again, dry running of the vehicle transmission can not occur. Also, in the event that power to the machine 12 is interrupted (i.e., if one of the clamps 18a becomes disconnected, for example), then the machine 12 reverts instantly to flush mode without the need for manual attention from an attendant and without power being required to effect this reversion to flush mode.

Figure 2:
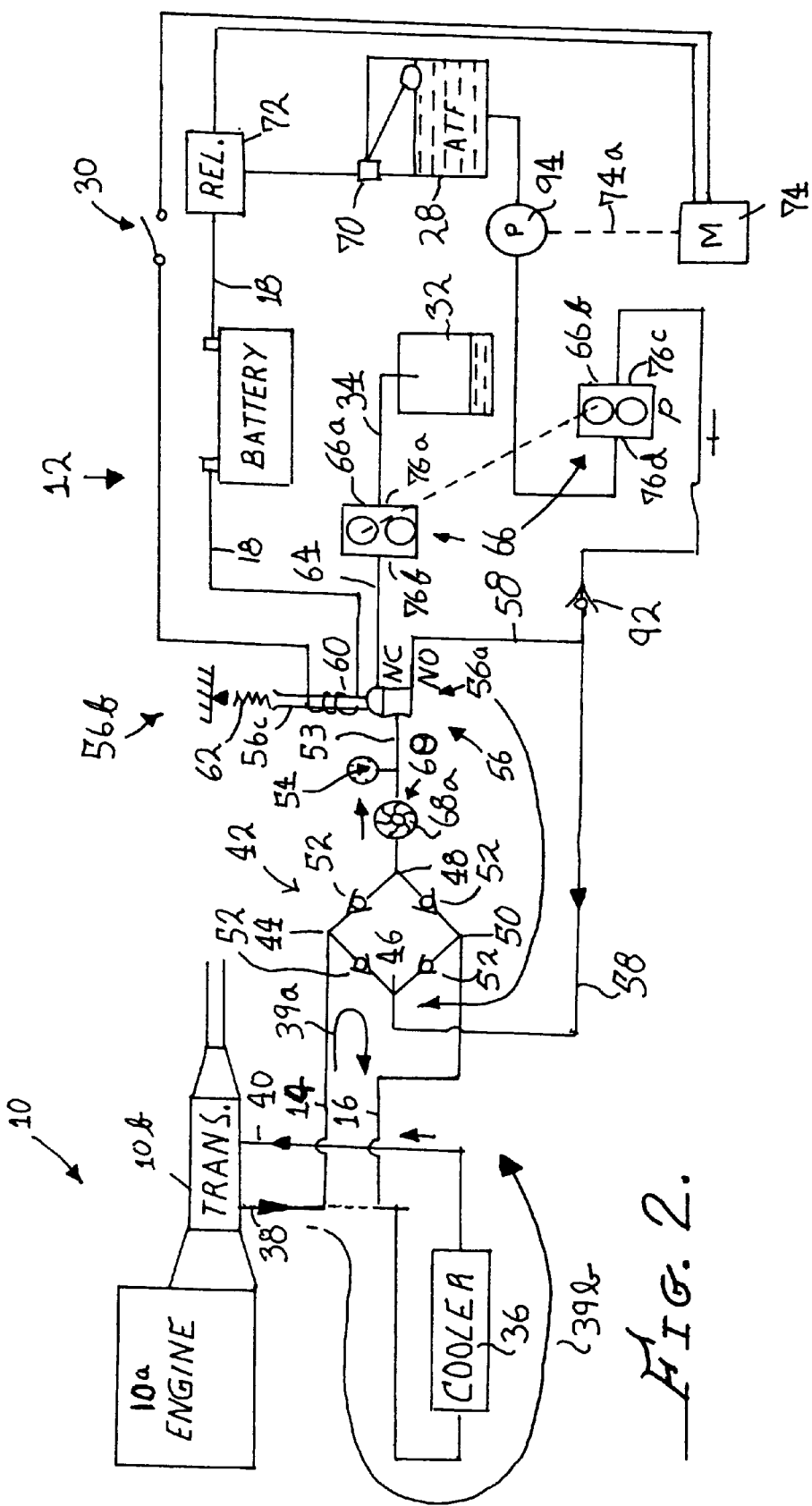

Attention now to FIG. 2 will reveal a schematic of the plumbing and functional structures of the machine 12. The engine and transmission of the vehicle 10 are indicated with numerals 15a and 10b, respectively. Those ordinarily skilled in the pertinent arts will understand that the transmission 10b is associated with a transmission fluid cooler 36 of the vehicle 10. Ordinarily, this transmission cooler 36 is built into a portion of the vehicle coolant radiator and is an ATF-to-engine-coolant type. Alternatively, the transmission cooler 36 may be configured as a separate ATF-to-air heat exchanger, which is usually installed behind the grill of the vehicle. In some cases, vehicles are equipped with both types of ATF coolers. The cooler 36 is connected in fluid flow to the transmission 10b by conduits 38 and 40, with ATF flow directions in these conduits being indicated by the arrows on FIG. 2. The conduits 38, 40, and cooler 36 cooperatively define an external closed ATF circulation loop for the transmission 10b, which external closed fluid circulation loop is indicated by numeral 39 on FIG. 2.

Conduit 38 is shown in FIG. 2 with a portion of its length depicted in dashed line. When the vehicle 10 is in normal operation, the dashed line portion of conduit 38 is connected together, and fluid flows from the transmission to the cooler 36 along this conduit. However, during service of the transmission using machine 12, one of the conduits 38 or 40 is interrupted as suggested in FIG. 2, and the machine 12 is connected into the previously-closed ATF circulation loop 39 for cooler 36. In FIG. 2, conduit 38 is the one shown opened for connection of machine 12. However, either of the conduits 38 or 40 may be so opened, dependent upon which one is most easily accessible to the service technician on each particular individual vehicle to be serviced. Either or both of the conduits 38 or 40 may be accessed for service of the transmission with absolutely no difference in the effectiveness of the service performed. In preparation for and during the transmission service, the accessed one or both of the conduits 38 or 40 is interrupted, and after the service is complete the connection of the conduit is restored to its original fluid flow continuity.

Machine 12 includes a fluid-flow rectifier assembly, indicated with numeral 42. This rectifier assembly includes four nodes (or fluid flow confluence and branching) respectively indicated with numerals 44, 46, 48, and 50; and also includes four check valves each indicated with a respective numeral 52. The check valves 52 are each disposed between a connected pair of the nodes 44–50, and are oriented as shown in FIG. 2. As is seen in FIG. 2, hose 14 connects to node 44, and the hose 16 connects to node 50. The check valves 52 are each oriented so that fluid can flow only to node 48 and only away from node 46. Accordingly, no matter which way the hoses 14 and 16 are connected to the opened ends of the interrupted one of conduits 38 or 40, ATF flow is always from one of nodes 44 or 50 to node 48, and from node 46 to the other one of nodes 44 and 50. Node 48 is connected by a conduit 58 including a pressure gauge 54 and a flow meter 68 to the common port of a spring-loaded three-way solenoid valve 56. The flow meter 68 has a visible pin-wheel or turbine-type of indicator 68a, which is displayed on the front of machine 12, as is seen in FIG. 1.

The solenoid valve 56 has a normally-open (N.O.) port from which a conduit 58 connects to node 46. Accordingly, a closed loop fluid flow connection is provided by machine 12, which when the machine 12 is connected as shown in FIG. 2, completes loop 39. This loop within machine 12 is indicated on FIG. 2 with two loop arrows referenced with numerals 39a and 39b. Loop 39a is a virtual loop which actually is completed by fluid flow in loop 39b, as will be described. During flush mode of operation as described above, the machine 12 completes the circulation loop 39 by flow of ATF in the internal loop indicated with numerals 39a and 39b of FIG. 2. During this circulation of ATF in the machine 12, the service technician can observe the available pressure provided by the internal pump of the transmission 10b at gauge 54, seen on the front of machine 12 in FIG. 1.

Further considering the three-way solenoid valve 56, it is seen that this solenoid valve includes a valve portion 56a and a solenoid actuator portion 56b. The solenoid actuator portion 56b includes an armature member 56c movably disposed within a solenoid coil 60, and a spring 62 biasing the armature 56c toward a first position. The armature member 58 interacts with the valve portion 56a so that when the armature 58 is in its first position the common port is connected only to the N.O. port of the valve portion 56a. When the solenoid coil 60 is actuated electrically, armature member 56c is moved to a second position (not shown) in which the common port of the valve portion 56b is connected only to the N.C. port of this valve portion. The N.C. port of solenoid valve 56 connects via a conduit 64 to one portion (a motor portion) of a motor/pump unit 66. From this motor portion (indicated with numeral 66a), fluid flows via a hose 34 to the waste-fluid container 32.

The machine 12 is also provided with a float switch 70 at reservoir 28, which electrically allows connection of the common port of solenoid valve 56 to the N.C. port only if a sufficient volume of new ATF is in this reservoir, and which closes if the level of this new ATF falls too low. Float switch 70 controls a relay 72 in series circuit with all of the switch 30, solenoid coil 60, a motor 74, and the battery of the vehicle 10 via cable 18. When the service technician closes switch 30, solenoid coil 60 and the motor 74 are both actuated if relay 72 allows (i.e., if the float switch 70 indicates a sufficient level of new ATF in the reservoir 28), and the common port of solenoid valve 56 is switched from communication with the N.O. port to communication to the N.C. port. Thus, the internal closed ATF circulation loop of the machine 12 (recalling arrows 39a and 39b) is opened, and used ATF from the transmission 10b flows to waste container 32.

Motor/Pump Unit

Figure 3:
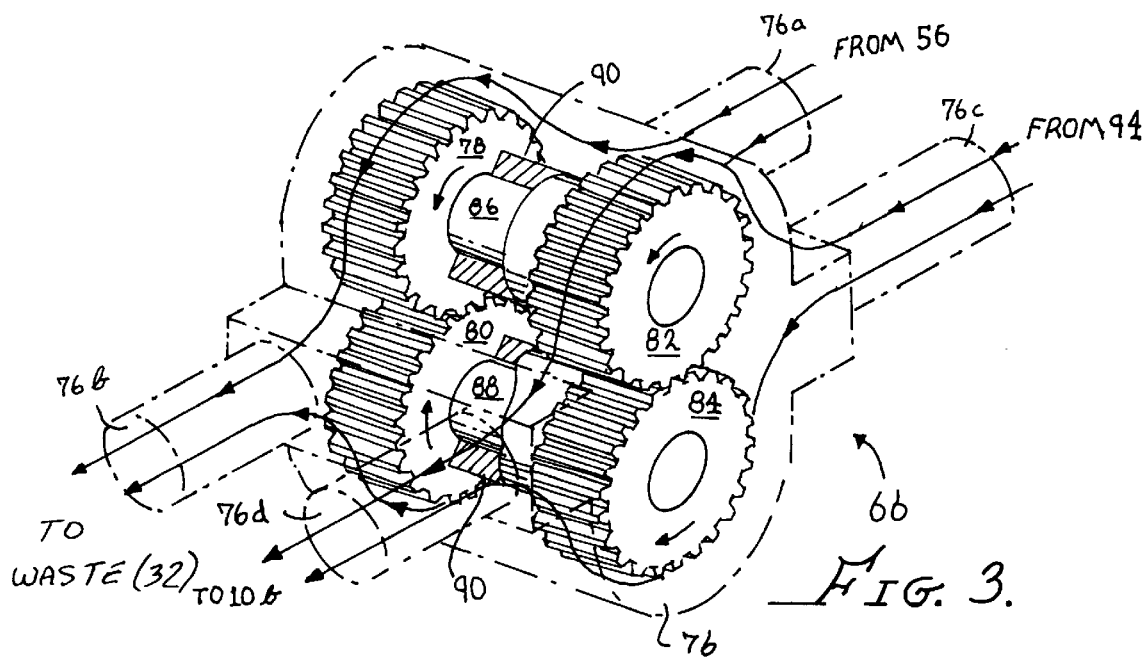

Considering now FIG. 3, it is seen that the motor/pump unit 66 includes a housing 76 defining an inlet port 76a and outlet port 76b from motor portion 66a. Similarly, the housing 76 defines an inlet port 76c and outlet port 76d to and from a pump portion 66b. The motor portion 66a and pump portion 66b are each defined by a meshed pair of spur gears (respectively indicated with numerals 78, 80, 82, and 84. The housing 76 defines closely fitted chambers for these meshed gears, which is conventional in the art of spur-gear pumps and motors. However, in this case, the housing 76 also journals a pair of connecting shafts, indicated with numerals 86 and 88. The shafts 88 and 86 drivingly connect the indicated spur gears for rotation in unison, as is indicated by the arrows on FIG. 3. Thus, as used ATF flows through the motor portion 66a (from port 76a to port 76b) of motor/pump unit 66 the gears 78 and 80 are forced to rotate as indicated, driving the gears 82 and 84 in rotation via shafts 86 and 88. The motor/pump unit 66 is a positive-displacement fluid motor/pump unit, with each side having identically the same fluid displacement per rotation of the gears 78–84 (ignoring some slight and insignificant volume of fluid which may leak from the motor portion to the pump portion of the unit).

Further to the above, it is seen that according to the one illustrated embodiment of the unit 66, the housing 76 carries a pair of elongate plain journal bearings 90 (only a portion of each being seen in FIG. 3 for clarity of illustration). These journal bearings 90 are closely and precisely fitted to the shafts 86 and 88 so that these shafts (and the gears 78–84) are very free running. Importantly, the close fitting of these journal bearings and shafts is relied upon to effect a sufficient fluid seal between the motor side and pump side of the motor/pump 66 so that only an insignificantly small amount of ATF flows along the shafts 86, 88 without the use of a contact type of sealing element. Consequently, no significant mixing of old ATF with new ATF takes place in the motor/pump unit 66.

Those ordinarily skilled in the pertinent arts will recognize that other sealing expedients are possible in motor/pump unit 66, and which also provide for free running of the internal components of this unit. For example, a labyrinth seal could be used along the length of the shafts 86 and 88 to inhibit fluid flow between the motor and pump portions of this unit, still without the use of a contact sealing element. Alternatively, a low-friction type of contact sealing element can be used on the shafts 86, 88. This may take the form of, for example, a carbon ring face seal, or a low-friction radial lip seal disposed between the housing 76 and each of the shafts 86, 88. Because these sealing expedients are old and well known in the pertinent arts, it is deemed that they need not be illustrated in this application. In each case, the motor/pump unit 66 can achieve motoring and pumping operation utilizing only a relatively low fluid pressure provided by the internal pump of transmission 10b. This makes transmission servicing possible even with the engine 10a idling.

To recap the above, it is seen that in a fluid flush mode of operation for the machine 10, the loop 39a/b is completed, and ATF fluid from the transmission 10b flows through the machine 10 and back to the transmission 10b. However, when the technician closes switch 30, provided there is a sufficient quantity of new ATF in the reservoir 28, the old ATF from the transmission 10b is directed under the pressure of the internal pump of the transmission to waste container 32. Simultaneously, it is desired that new ATF is drawn from reservoir 28, flows from port 76c to port 76d of the pump portion 66b of motor/pump unit 66, and is delivered to the loop 39b via a check valve 90.

However, it has been discovered that some vehicles have automatic transmissions of such low pressure or low flow rate that even though the motor/pump unit 66 is extraordinarily free running, the available pressure/flow from the internal pump of the transmission is not sufficient. Accordingly, the present inventive apparatus 12 includes a electrically-driven assist pump 94 which is driven by the drive shaft 74a of motor 74.

Importantly, the pump 94 and motor 74 impose a very low energy demand on the electrical system of the vehicle 10 being serviced. Also, the motor 74 and pump 94 together develop a small fluid pressure, so small in fact that should the motor 74 and pump 94 be running while a vehicle 10 under service is not running (i.e., so that the internal transmission pump is not being driven by the vehicle engine 10a) then the motor/pump 66 will not be driven by the motor 74 and pump 94. Consequently, no withdrawal of old ATF will occur under these conditions, and no new ATF will be put into the transmission 10b. This is desirable, because the transmission 10b needs to be actively driven by the engine 10a during fluid exchange to operate not only the internal pump of the transmission, but also its control valves, torque converter, clutch actuators, and other components.

However, in view of the above, it is seen that when the vehicle engine 10a is running, and switch 30 is closed with a sufficient quantity of ATF in reservoir 28, then and only then, the solenoid valve 56 directs the used ATF from the loop 39a to waste container 32, and new AFT fluid from reservoir 28 is moved by pump 94 and the pumping portion 66b of the motor/pump 66 to the transmission 10b. This new ATF flows to the node 46, and then to the one of the hoses 14 and 16 which is connecting to the connection at the conduits 38 and 40 having the lower pressure. It will be understood in view of the above, that fluid flow in the apparatus seen in FIG. 2 is being impelled cooperatively by the internal pump of the transmission 10b, and by the pump 94 driven by motor 74. The motor/pump unit 66 acts to insure that the volume of old ATF substantially matches the volume of new ATF provided to the transmission 10b.

Further, there is a progressive pressure drop along the length of all flow paths, and the fluid flow at the connections to one of conduits 38 and 40 will be differentiated from one another by this fluid pressure differential. Accordingly, no matter which one of the conduits 38 or 40 is interrupted for transmission service, and no matter which way the hoses 14 and 16 are connected to the open ends of the interrupted conduit 38 or 40, flow of used ATF will be from one of these open ends of the interrupted conduit 38 or 40, and flow of new ATF will be delivered by the machine 12 into the other open end of the interrupted conduit. In other words, the circulation loop 39 of the transmission is complete during flush mode and appears to be complete during exchange mode also, but new ATF is being supplied by the machine 12 in response to and in matching volume to the pumping out of old ATF by the transmission 10b during exchange mode. During this fluid exchange mode of operation, the technician can verify that fluid is flowing by observing the indicator 68a of flow meter 68. Preferably, this flow meter is a turbine type with a transparent wall through which the technician can not only seen the spinning turbine, but can also observe the color and turbidity of the ATF flowing from the transmission to waste (i.e., this is visible on the front of machine 12 as seen in FIG. 1). Thus, when the out-flowing ATF is observed to change from the turbid burnt-umber of old fluid to the clear bright red of new fluid, the technician knows that the flushing and fluid exchanging operation is complete.

Assistance Pump 94 and Motor 74

Considering now FIGS. 4, 5, and 6, the details of a particularly preferred pump 94 are presented. This pump 94 is in-unit with the motor 74, although this need not be the case. In other words, other types and styles of assist pumps may be employed without departure from the spirit and scope of the present invention. For example, an assist pump which is driven by a power source other than the battery of a vehicle under service may be preferred in some instances. An example of this type of assist pump is one that is driven by an air motor receiving power from a source of shop air. However, the present pump 94 is integral with its motor 74 and is particularly preferred. Further, pump 94 is of a nutating, disk design, which is also particularly preferred because of its combination of low energy usage and low developed pressure head.

Turning now to FIGS. 4–6 in combination with one another, it is seen that the pump 94 includes a pump housing 96 having a cavity 96a therein which is circular in plan view (see FIG. 5). An inlet 98 leads to the cavity 96a, and an outlet 100 leads from this cavity. The pump housing 96 includes housing sections 102 and 104 having confronting faces, with the confronting faces of the housing section 102 having an annular groove 106, and the confronting face of section 104 having an annular rib 108 received in this groove to axially align the housing sections. An annular seal 110 is retained cooperatively by the groove 106 and rib 108. Threaded fasteners 112a secure the housing sections removably together, while fasteners 112b secure the pump 94 to the motor 74.

The cavity 96a is bounded by opposing wall sections 114a and 114b, which are divergent conic sections. Within the divergent conic sections, each wall section 114a and 114b, also includes a respective part-spherical recess 116a and 116b. A stepped bore 118 opens on recess 116b, through which the shaft 74a of motor 74 extends into the cavity 96a. A seal member 120 is received in a larger-diameter portion of the bore 118 and sealingly cooperates with the shaft 74a to prevent fluid leakage from the cavity 96a into the motor 74. The housing sections 102 and 104 each also have a part-spherical peripheral wall section 122a and 122b, which cooperatively define respective portions of openings 124a and 124b, respectively leading to the inlet 98 and outlet 100.

A wobble plate member 126 is received in the cavity 96a for nutating non-rotational movement. The wobble plate member will be seen to effectively divide cavity 96a into an upper pumping chamber 96a' and a lower pumping chamber 96a". Further, the member 126 includes an interrupted circular plate portion 126a, which has an interrupted part-spherical outer peripheral surface 126b, and a part-spherical central hub portion 128. The plate portion 126 defines an interrupting slot 130 extending from the outer surface 126b (i.e., where the slot 130 interrupts this surface) radially inwardly to a part-spherical joining surface 128a defined on the hub 128 and spherically connecting the part-spherical surface portions of hub 128 above and below the plate portion 126a.

The hub portion 128 defines a through cylindrical bore 132 into which is received a nutation bushing 134. The nutation bushing 134 has a cylindrical outer surface 134a providing a bearing surface rotationally cooperating with the inner surface of the member 126 at bore 132. Inwardly, the nutation bushing 134 defines a bore 134b which is off-axis with respect to the surface 134a. That is, the bore 134b is angulated relative to the surface 134a. The shaft 74a of motor 74 is drivingly received into bore 134b. The motor shaft 74a extends generally perpendicularly to cavity 96. Consequently, when the motor shaft 74a rotates, the member 126 can be driven in nutation in cavity 96.

In order to prevent the member 126 from rotating with the shaft 74a, a separator member 136 is received pivotally at oppositely extending trunnions 136' into aligned bores 138a and 138b respectively defined in the housing sections 102 and 104. The separator member 136 includes a wedge-shaped radially inwardly extending plate part 136a, which terminates in a part-spherical surface 136b confronting and sealingly cooperating with the plate member 126 at surface 128a in slot 130. The separator member 136 also serves to separate or prevent fluid flow between the inlet port 98 from outlet port 100 except by way of the pumping chambers 96a' and 96a".

An advantage of the nutating pump 94 is that it develops a substantially constant flow volume. The pump 94 also has a low power requirement from motor 74, so that this motor draws little power from the vehicle battery via cable 18. Further, as was explained above, the pump 94 develops little fluid pressure head. An advantage of this low pressure head provided by the pump 94 in the present instance is that the motor/pump unit 66 will not be motored by fluid pressure delivered by the pump 94 alone. That is, unless the vehicle 10 is operating (i.e., its motor 10a must be running to drive the internal pump of transmission 10b) there will be no fluid flow from the reservoir 28 into the transmission and no used ATF will be discharged from the transmission.

However, and to repeat, when the service technician does activate the machine 12 to exchange the old ATF from transmission 10b and to replace this old ATF with new ATF, in the event that the vehicle 10 is one of those having low pressure or low flow from the internal transmission pump, then the pump 94 will provide an adequate assistance and the motor/pump unit 66 will be driven to exchange the old ATF with new ATF on a matched volume basis. Further, in the event the level of new ATF in reservoir 28 drops too low during the service process, and even if the attendant is not present, the float switch 70 will open electrically, and as a result the spring-loaded solenoid will return valve 56a to the position connecting the common port only to the N.O. port.

This takes place due to its own spring bias and the fact that the solenoid actuator 56b can be back-driven by this spring bias. Motor 74 is also shut off, stopping operation of pump 94. Thus, in the event of cessation of operation of the machine 12 (because of interruption of electrical power, for example) or a shortage of fresh transmission fluid, the loop 39 is restored, withdrawal of transmission fluid stops, and the transmission 10b can not run out of fluid or be damaged by dry running.

Such is also the case in the event that the engine 10a stops running during a service procedure while the technician is not present, for example, then some of the control valves and clutch actuators, for example, would not be receiving new ATF and would harbor old ATF if the exchange were continued by the machine 12. However, the present machine 12 cannot continue such a fluid exchange with the engine of the vehicle not running. In this way, a proper and complete service of the transmission is assured, and low-flow and low-pressure transmissions can be serviced with no difference either in the service procedure or the time taken for this procedure in the view of the service technician.

Those ordinarily skilled in the pertinent arts will understand that when the process described above is complete, the technician disconnects the machine 12 at the connections to one of the conduits 38 or 40, restores the circulation loop 39, and sends the old transmission fluid for disposal or to a recycling facility.

Hydraulic Rectifier 42

Figure 7:
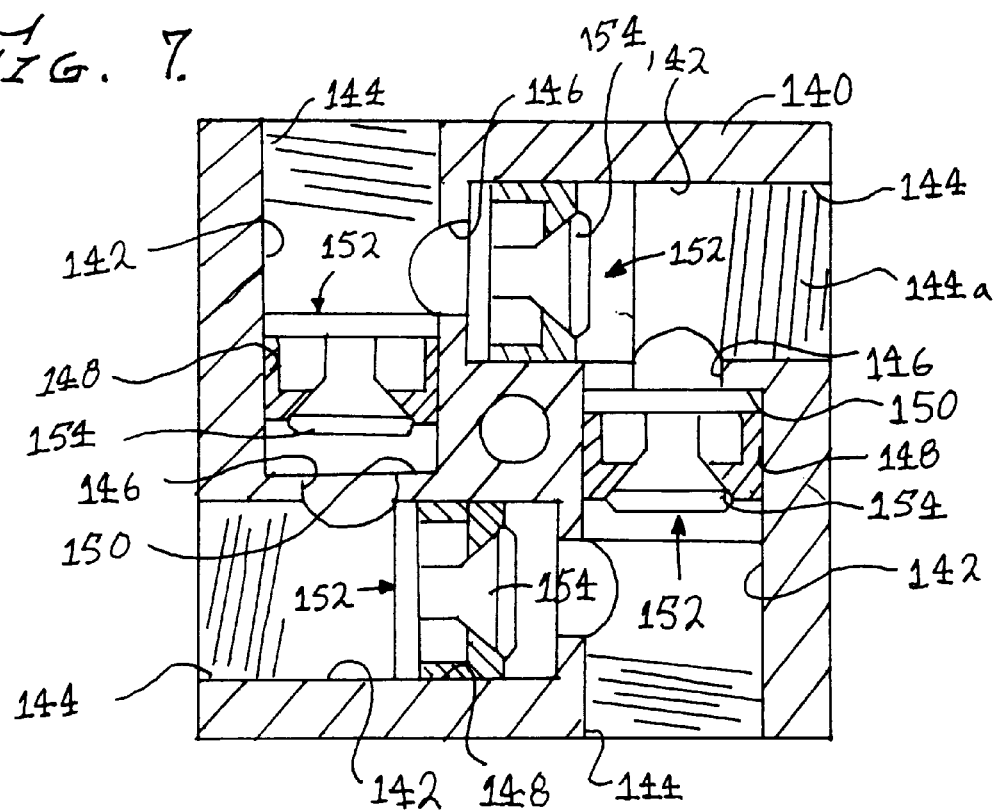
Figure 8:
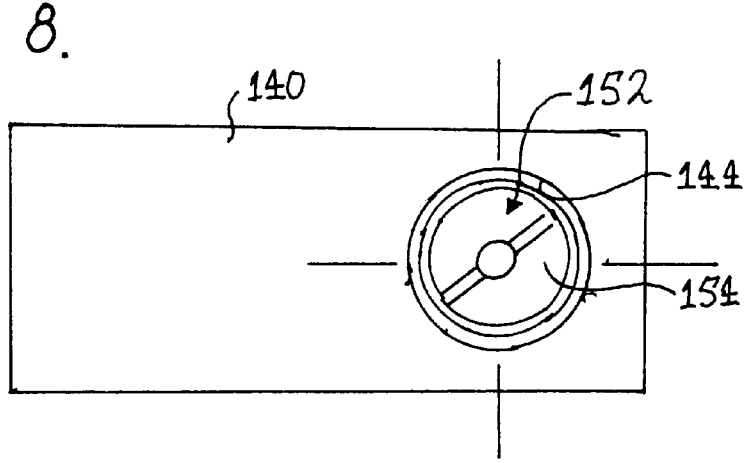

Turning now to FIGS. 7–10 in conjunction with one another, in FIGS. 7 and 8 is seen a particularly preferred embodiment of hydraulic rectifier 42. This rectifier 42 includes a valve housing or body 140, which in this particular instance is a rectangular metallic prismatic body. The body 140 is a single piece of metal, or is unitary. This body defines four intersecting bores 142. These bores all are stepped, blind, and each is substantially the same as the others. In other words, each bore has only a single opening 144 outwardly on the body 140. At 144a each bore provides for connection of a fluid conduit to the body 140 so that fluid is communicated between the respective bore 142 and the conduit. In the illustrated embodiment, the provision 144a is satisfied by an outermost portion of each bore 142 defining a tapered pipe thread. Thus, conduits (i.e., pipes) may be threadably and sealingly united with the housing 140 at the bores 142. Alternative ways of connecting fluid flow conduits to and from the rectifier 42 will suggest themselves to those ordinarily skilled in the pertinent arts.

In this preferred embodiment of the rectifier 42, the bores 142 are arranged in mutually parallel pairs, with each pair being perpendicular to the other pair. At a smaller diameter section 146 each bore communicates with one other of the four bores 142. As a result, each bore 142 defines only a single opening 144 outwardly on the housing 140, and extends from this opening to the intersection with one other of the bores 142. However, internally of the housing 140, all of the bores 142 are communicated with one another to define a single flow path communicating all of the openings 144 with one another.

Adjacent to the smaller diameter section 146 of each bore 142, a respective larger diameter bore section 148 provides a step 150 on the bore, with the step disposed away from the bore section 146. Sealingly received in each respective bore 142 against the step 150 is a respective one of four unidirectional check valve assemblies 152. These check valve assemblies 152 are all substantially the same, and will be described in greater detail below. However, viewing FIG. 7, it is seen that the valves 152 are not installed all the same way into their respective bores. In other words, for the present it is sufficient to note that two valves 152 are disposed with a head portion 154 of these valves disposed toward the bore opening 144 having the single-headed arrow pointing outwardly of this bore. Fluid may flow only out of this bore opening. Two valves 152 are also installed with their head portions 154 disposed away from the bore opening 144 having the single-headed arrow pointing into this bore opening. Fluid may flow only into this bore opening. The result is that the other two bore openings 144 (i.e., the ones seen in FIG. 7 with double-headed arrows) allow fluid flow into or out of these openings.

Figure 9:
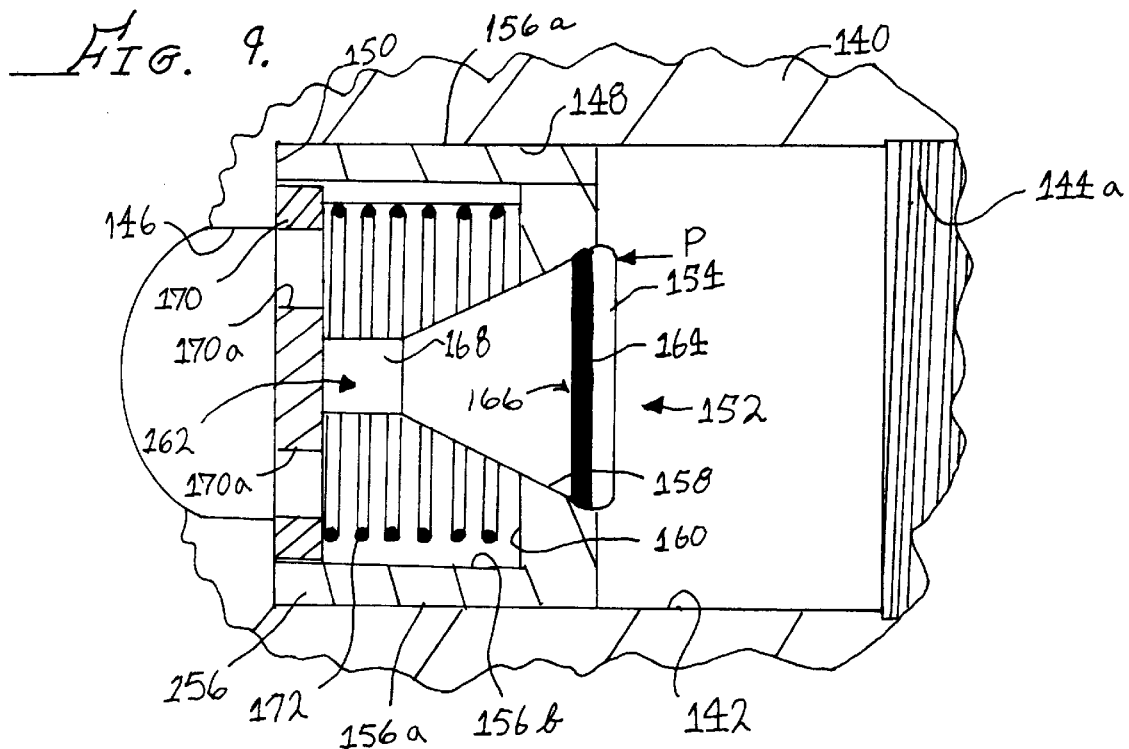
Figure 10:
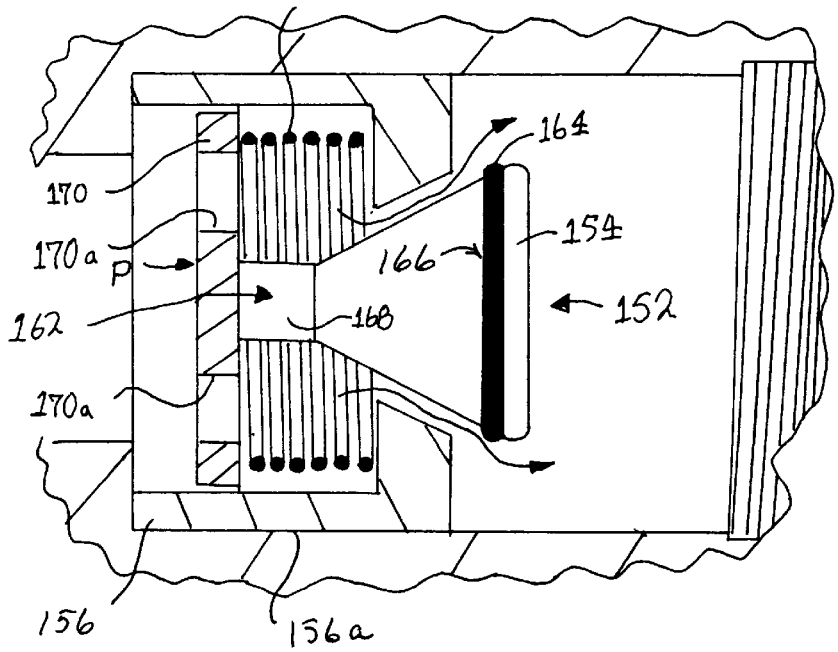

Considering now FIGS. 9 and 10, it is seen that each valve assembly 152 includes a tubular body 156 having a cylindrical outer surface 156a for press fitting sealingly into the bore section 148 (i.e., into engagement with the step 150), and a stepped through bore 156b. The bore 156b defines a tapered seating surface 158 at one end of the body 156, and an opposite shoulder 160. The conical head portion 154 of a movable valve member 162 is sealingly engageable with this tapered seating surface. The head portion 154 carries an O-ring type of sealing member 164 disposed in a groove 166 circumscribing the head portion 154 and sealingly engaging the seating surface 158 in a first (or closed) position for the valve member 162, as is seen in FIG. 9. The valve member 162 includes a stem portion 168 extending from the head portion 154 to a perforate disk portion 170. The disk portion 170 defines several through perforations 170a which allow fluid flow toward the head portion 154. Extending between the disk portion 170 and the shoulder 160 is a coil compression spring 172. In view of the above (and as seen in FIG. 9), it is seen that when fluid pressure is applied to head portion 154 to urge this head portion toward the seating surface 158 (depicted in FIG. 9 by the arrow and character "P") the sealing member 164 is tightly seated against the surface 158, and fluid flow through the valve 152 is blocked.

On the other hand (as seen in FIG. 10), when fluid pressure is applied to the head portion 154 to urge this head portion away from the seating surface 158 (i.e., communicated to this side of the head portion via the perforations 170a in the disk 170) then the head portion 154 moves away from the seating surface 158, compressing spring 172 slightly, and allowing fluid flow through the bore 156b.

Alternative Torque-Motor Assistance

Figure 11:
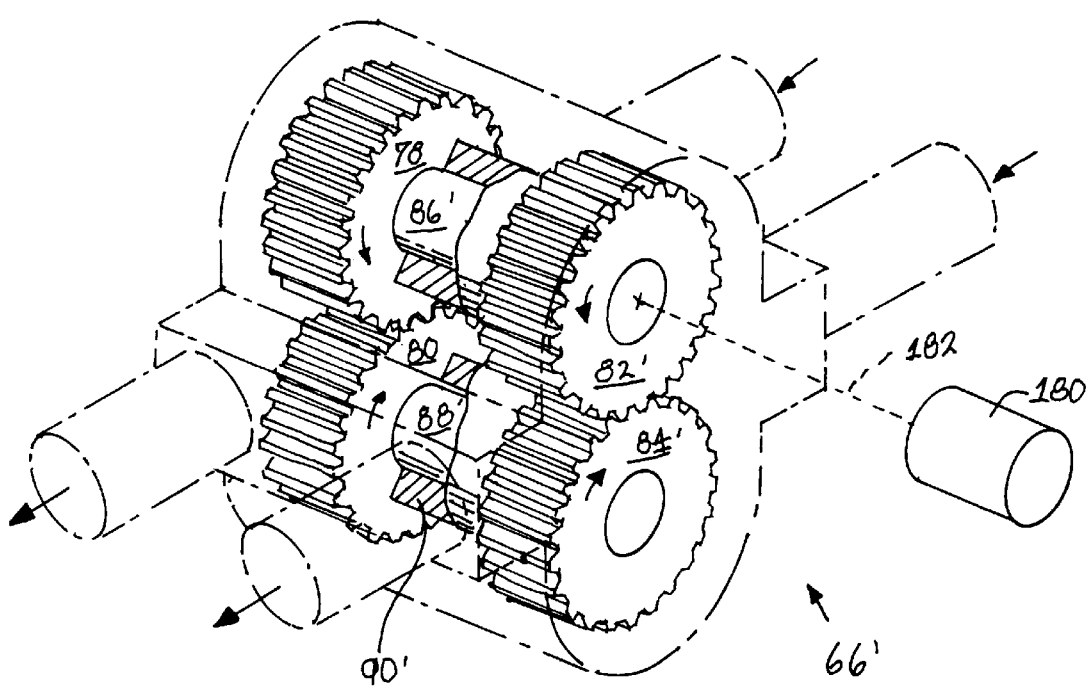

Finally, turning now to FIG. 11, another alternative embodiment of the machine 12 is seen, which is the same in all respects with the embodiment described above except as is set out below. Because of this similarity, the features of FIG. 11 which are the same as or which are analogous to those depicted and described above are referenced on FIG. 11 using the same reference numeral used above, and having a prime (i.e., ') added thereto. The embodiment of FIG. 11 does not include the motor 74 or pump 94 as described above. Instead, assistance to low-flow and low-pressure automatic transmissions in operating the fluid exchange function of the machine 12 is provided by a torque motor 180 drivingly connected to a modified motor pump unit 66'. The motor/pump unit 66' is like the unit 66 described and depicted above, with the exception that it provides for a torque transmitting connection 182 of the motor 180 to at least one of the shafts 86', 88'. In this way, the motor/pump unit can be assisted to exchange fluid in low-flow and low-pressure automatic transmissions. Thus, in this alternative embodiment, assistance pump 94 and motor 74 as described above are not needed. However, and consistently with the first embodiment described above, the torque motor 180 and/or its coupling 182 to the motor/pump unit 66' is selected such that it alone will not motor the motor/pump unit 66'. In other words, the motor/pump unit 66' is not operated as a pump in the absence of fluid flow provided by the internal pump of an automatic transmission connected with a running engine. Restated, the cooperative effect of fluid pressure provided by the operating internal pump of an automatic transmission and of motor/pump unit 66' assisted by motor 180 are required in order to effect exchange of fluid in an automatic transmission using the embodiment seen in FIG. 11.

While the present invention has been depicted, described, and is defined by reference to a single particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. Thus, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. For use with an automotive vehicle having an engine and an automatic transmission, the transmission having an internal pump operated when the engine drives the transmission so that ATF from the transmission is pumped through an external fluid circulation loop of the vehicle and back to the transmission, a method of exchanging used ATF from the transmission with new ATF comprising steps of:

providing a source of new ATF;

opening said external fluid circulation loop to provide a pair of loop connections, so that one loop connection of said pair of loop connections provides outflow of old ATF to waste;

flowing new ATF from said source to the other loop connection of said pair of loop connections so as to effect a pseudo-closing of said opened external fluid circulation loop;

providing a first conduit for conducting ATF from said one loop connection to one bi-directional flow port of a unitary hydraulic rectifier, and providing a second conduit for conducting ATF from another bi-directional flow port of said unitary hydraulic rectifier to said other loop connection;

providing the unitary hydraulic rectifier with a unitary body defining four ports, and four intersecting passages each leading from a respective one of said four ports only to another one of said four passages, disposing a respective one of four one-way valves in each of said four passages, and disposing said four one-way valves so that one port of said four ports is exclusively an inflow port, one port of said four ports is exclusively an outflow port, and the other two ports of said four ports each allow bi-directional flow;

providing fluid flow communication from said exclusive outflow port to waste, and from said source of fresh ATF to said exclusive inflow port.

2. The method of claim 1 further including the step of providing an electrically driven pump for assisting flow of fresh ATF from said source to said exclusive inflow port of said unitary hydraulic rectifier.

3. The method of claim 2 further including the step of powering said electrically driven pump using an motor receiving electric power from an electrical system of said vehicle during operation of said engine.

4. The method of claim 1 further including the steps of:
   providing a motor/pump unit having a motor portion receiving flow of used ATF from said exclusive outflow port of said hydraulic rectifier to simultaneously drive the motor portion of the motor/pump unit, and a pump portion of said motor/pump unit receiving fresh ATF from said source and pumping this fresh ATF to said exclusive inflow port of said unitary hydraulic rectifier.

5. The method of claim 4 further including the step of providing for each of said motor portion and said pump portion to displace an equal volume of fluid during simultaneous operation of the motor/pump unit.

6. A unitary hydraulic rectifier comprising;
   a unitary body providing a housing for said unitary hydraulic rectifier, said body being configured in plan view as a rectangular prism having four side edges and a thickness, and said body defining four bores each extending parallel to the plane of said plan view and opening outwardly of said body only on a respective one of said four side edges to define a respective one of four bore openings;
   each one of said four bores intersecting and communicating with a next adjacent one of said four bores intermediate of an opening of the next-adjacent bore on a respective side edge of said body and the intersection of said next-adjacent bore with another of said four bores, so that said four bores communicate each bore opening with the other three of said four bore openings;
   each bore opening outwardly on said body defining a respective one of four fluid flow ports on the body, said four fluid flow ports providing a fluid inlet port exclusively for fluid flow into said body, a fluid outlet port exclusively for fluid flow from said body, and a pair of bi-directional ports allowing fluid flow both into and out of said body; and
   four unidirectional flow check valves, each check valve being interposed in a respective one of said four bores between the opening of the respective bore and the communication of the bore with the next-adjacent one of the four bores, and said four check valves being disposed for unidirectional flow in the respective ones of said four bores so as to allow fluid flow only into said inlet port, only from said outlet port, and both into and from said bi-directional ports.

7. The unitary hydraulic rectifier of claim 6 wherein each one of said four unidirectional flow check valves includes a tubular body sealingly received into a respective one of said four bores, said tubular body having a stepped through bore defining a tapered seating surface, a movable valve member received into said stepped through bore and having a conical head portion sealingly engageable with said tapered seating surface in a first position for said valve member to block fluid flow through said through bore of said tubular body, said valve member including a stem portion extending from said conical head portion to a perforate disk portion, said perforate disk portion defining plural through perforations allowing fluid flow through said disk portion, and a yieldable biasing member extending between said disk portion and said tubular body to yieldably urge said conical head portion into said first position, so that fluid pressure is applied to said conical head portion via said perforations of said disk member unseat said conical head portion to allow fluid flow through said tubular body.

8. Apparatus for simultaneously exchanging used ATF with new ATF in an automotive automatic transmission during operation of the transmission, and while an internal pump of the transmission pumps ATF from the transmission in an external fluid circulation loop and back to the transmission, said apparatus comprising:
   a source of new ATF;
   means providing a pair of loop connections to the external fluid circulation loop so that the loop is opened and one loop connection of said pair provides flow of old ATF to waste; and means for flowing new ATF from said source to the other loop connection of said pair of loop connections so as to effect a pseudo-closing of said opened external fluid circulation loop;
   a unitary hydraulic rectifier with a unitary body defining four ports, the unitary body defining also four intersecting passages each leading from a respective one of said four ports only to another one of said four passages, four one-way valves disposed one in each of said four passages, each one of said four one-way valves being so disposed that one port of said four ports is exclusively an inflow port, one port of said four ports is exclusively an outflow port, and the other two ports of said four ports each allow bi-directional flow;
   a first conduit for conducting ATF from said one loop connection to one bi-directional flow port of said unitary hydraulic rectifier, a second conduit for conducting ATF from another bi-directional flow port of said unitary hydraulic rectifier to said other loop connection;
   means providing fluid flow communication from said exclusive outflow port to waste, and means providing flow of fresh ATF from said source to said exclusive inflow port; and
   a positive displacement motor/pump unit connecting into said external fluid circulation loop via said conduits and unitary hydraulic rectifier so that while loop is opened old ATF from the transmission flows via a motor portion of the motor/pump unit to waste and drives a pump portion of said motor/pump unit;
   whereby, either one of said first conduit and said second conduit may be connected individually to either one of said pair of loop connectors, and said unitary hydraulic rectifier provides for flow of used ATF to waste and flow of fresh ATF from said source to said transmission.

9. The apparatus to claim 8 further including an assistance pump flowing new ATF from said source through said pump portion of said motor/pump unit to said automatic transmission so as to effect a pseudo-closing of said external fluid circulation loop, whereby used ATF pumped out of said transmission by said internal pump is continuously replaced in equal volume with new ATF from said source by said assistance pump and said motor/pump unit in cooperation.

10. A fail-safe transmission fluid exchange machine for an automotive automatic transmission, which automatic transmission includes an internal pump moving automatic transmission fluid (ATF) through an external ATF cooler in a circulation loop, said machine comprising:
   a conduit for conducting ATF from said circulation loop to a common port of a three-way valve, said three-way valve in a first position communicating ATF received via said first conduit from said circulation loop to a second conduit via a normally-open (N.O.) port, which second conduit returns ATF to said circulation loop, said three-way valve in a second position thereof communicating ATF from said circulation loop via a normally-closed (N.C.) port to waste;

a yieldably-biased back-driveable actuator which when actuated moves said three-way valve from said first to said second position thereof and which when deactivated returns said three-way valve to said first position by self-bias;

a container for holding a supply of new ATF;

a sensor for indicating when said container holds an adequate supply of new ATF;

a motor/pump unit having a motor portion disposed in fluid flow series between said N.C. port of said three-way valve and waste to be driven by ATF pumped out of said transmission; and a pump portion receiving new ATF from said container therefor and supplying said new ATF pressurized via said second conduit to said circulation loop, said motor portion and said pump portion of said motor/pump unit being drivingly coupled to one another for operation simultaneously in unison with each displacing an equal volume of fluid;

an assistance pump unit drawing power from a source other than said internal pump of said transmission, said assistance pump being in fluid low series with said pump portion of said motor/pump unit and flowing new ATF toward said transmission;

a control system interconnecting said sensor and said actuator to allow actuation of said actuator to place said three-way valve in said second position only while said sensor indicates an adequate supply of new ATF, said control system deactivating said actuator in the event of an inadequate supply of new ATF to allow said three-way valve to be returned to said first position by self-bias of said actuator; and a unitary hydraulic rectifier with a unitary body defining four ports, the unitary body defining also four intersecting passages each leading from a respective one of said four ports only to another one of said four passages, four one-way valves disposed one in each of said four passages, each one of said four one-way valves being so disposed that one port of said four ports is exclusively an inflow port, one port of said four ports is exclusively an outflow port, and the other two ports of said four ports each allow bi-directional flow;

whereby either of said first conduit or said second conduit may be connected in said circulation loop of said transmission so as to receive old ATF pumped by the internal pump of the transmission, and either one of said first conduit or said second conduit can be connected into the circulation loop of the transmission so as to deliver new ATF to the circulation loop, with said unitary hydraulic rectifier providing for communication of old ATF from said transmission to waste, and communication of new ATF from said container into said transmission.

11. A method of exchanging used ATF with new ATF in an automotive automatic transmission having an internal pump and an external fluid circulation loop, said method comprising steps of:

providing a source of new ATF;

providing an assistance pump and a power source for this assistance pump;

connecting a positive displacement motor/pump unit into said external fluid circulation loop, so that said loop is opened and old ATF from the transmission flows via a motor portion of the motor/pump unit to waste by reason of pressure provided by said internal transmission pump and assists in driving a pump portion of said motor/pump unit;

providing a unitary hydraulic rectifier with a unitary body defining four ports, utilizing the unitary body to define four intersecting passages each leading from a respective one of said four ports only to another one of said four passages, providing four one-way valves disposed one in each of said four passages, and disposing each one of said four one-way valves so that one port of said four ports is exclusively an inflow port, one port of said four ports is exclusively an outflow port, and the other two ports of said four ports each allow bi-directional flow, and flowing new ATF from said source through said assistance pump, said pump portion of said motor/pump unit, said unitary hydraulic rectifier, and to said automatic transmission so as to effect a pseudo-closing of said external fluid circulation loop, whereby used ATF pumped out of said transmission by said internal pump flows via said unitary hydraulic rectifier to said pump portion of said motor/pump unit and to waste, and the used ATF is continuously replaced in equal volume with new ATF from said source by said assistance pump in cooperation with said pump portion of said motor/pump unit.

12. The method of claim 11 wherein said power source for said assistance pump is selected from the group consisting of: an electric motor, an air motor, and a torque motor.

13. The method of claim 12 further including the step of powering said assistance pump using an electric motor receiving electric power from an electrical system of a vehicle having said automatic transmission.

14. The method of claim 11 including the step of utilizing a positive displacement pump as said assistance pump.

* * * * *